(12) United States Patent
Skinner (10) Patent No.: US 8,018,729 B2
(45) Date of Patent: Sep. 13, 2011

(54) METHOD AND HOUSING FOR MEMORY MODULE INCLUDING BATTERY BACKUP

(75) Inventor: Brian Skinner, Gainesville, GA (US)

(73) Assignee: LSI Corporation, Milpitas, CA (US)

( * ) Notice: Subject to any disclaimer, the term of this patent is extended or adjusted under 35 U.S.C. 154(b) by 480 days.

(21) Appl. No.: 12/070,431

(22) Filed: Feb. 19, 2008

(65) Prior Publication Data

US 2009/0231798 A1  Sep. 17, 2009

(51) Int. Cl.
*G06F 1/16* (2006.01)
*H05K 7/00* (2006.01)
*H05K 5/00* (2006.01)

(52) U.S. Cl. .................... 361/760; 361/679.58

(58) Field of Classification Search ............ 361/679.32, 361/785, 809, 679.02, 679.31, 679.58, 760, 361/784

See application file for complete search history.

(56) References Cited

U.S. PATENT DOCUMENTS

| | | | | |
|---|---|---|---|---|
| 4,575,038 A * | 3/1986 | Moore | ........................... | 361/717 |
| 4,623,206 A * | 11/1986 | Fuller | ............................ | 439/81 |
| 5,130,888 A * | 7/1992 | Moore | ............................ | 361/717 |
| 5,331,507 A * | 7/1994 | Kyung et al. | ................. | 361/760 |
| 5,398,157 A * | 3/1995 | Paul | .......................... | 361/679.31 |
| 5,528,460 A * | 6/1996 | Byrd | ............................ | 361/752 |
| 5,726,859 A * | 3/1998 | Khadem et al. | ............... | 361/760 |
| 6,358,079 B1 * | 3/2002 | Noble | ........................... | 439/328 |
| 6,469,474 B2 * | 10/2002 | Bunker | ......................... | 320/132 |
| 6,544,061 B1 * | 4/2003 | Yasufuku et al. | ............. | 439/310 |
| 6,751,103 B1 * | 6/2004 | Sivertsen | ...................... | 361/825 |
| 6,992,893 B2 * | 1/2006 | Miyamura et al. | ............ | 361/705 |
| 7,007,184 B2 * | 2/2006 | Sabotta et al. | ................ | 713/340 |
| 7,103,694 B2 * | 9/2006 | Schumacher et al. | ........ | 710/300 |
| 7,173,818 B2 * | 2/2007 | Hou et al. | ................ | 361/679.56 |
| 7,397,671 B2 * | 7/2008 | Cleveland et al. | ............ | 361/756 |
| 7,414,854 B1 * | 8/2008 | Douglas | ........................ | 361/752 |
| 7,524,196 B2 * | 4/2009 | Bond | ............................. | 439/92 |
| 7,589,974 B2 * | 9/2009 | Grady et al. | ..................... | 361/735 |
| 7,672,141 B2 * | 3/2010 | Middleton et al. | ............ | 361/785 |
| 2002/0056018 A1 * | 5/2002 | Schumacher et al. | ........ | 710/300 |
| 2002/0059492 A1 * | 5/2002 | Sabotta et al. | ................ | 710/301 |
| 2002/0080541 A1 * | 6/2002 | Bunker et al. | ................... | 361/72 |
| 2004/0017662 A1 * | 1/2004 | Liu | ............................... | 361/719 |
| 2006/0092602 A1 * | 5/2006 | Hou et al. | ...................... | 361/679 |
| 2006/0232922 A1 * | 10/2006 | Tong | .............................. | 361/685 |
| 2007/0070610 A1 * | 3/2007 | Cleveland et al. | ............ | 361/756 |
| 2008/0084680 A1 * | 4/2008 | Islam et al. | .................... | 361/788 |

\* cited by examiner

*Primary Examiner* — Jinhee Lee
*Assistant Examiner* — Adrian S Wilson
(74) *Attorney, Agent, or Firm* — Suiter Swantz pc llo (57) ABSTRACT

A device may include protective housing including a battery backup unit circuit, at least one L-hook disposed on the protective housing including a battery backup unit circuit, the L-hook configured for being coupled to a test point loop disposed on a memory module, and/or at least one retention arm configured to couple the protective housing including a battery backup unit circuit to the memory module. Additionally, a RAID controller card and a method utilizing the device are disclosed.

19 Claims, 9 Drawing Sheets

METHOD AND HOUSING FOR MEMORY MODULE INCLUDING BATTERY BACKUP

TECHNICAL FIELD

The present invention relates to the field of electronic data storage and particularly to a system and method for implementing a battery backup unit for memory cache.

BACKGROUND

A computer memory module may often include random access memory and/or read only memory. Another type of memory, cache memory, may include random access memory that a computer may access more quickly than regular random access memory. A cache may include a temporary storage area where frequently accessed data may be stored for quick access. When the microprocessor processes information, it searches the cache memory first in turn reducing the access time.

A computer memory module may often include a remote battery backup unit, which requires the use of a cable to connect the remote battery backup to the computer memory module. A remote battery backup unit may include a power supply which may be switched on during the failure of a primary power source.

SUMMARY

A device may include protective housing including a battery backup unit circuit, at least one L-hook disposed on the protective housing including a battery backup unit circuit, the L-hook configured for being coupled to a test point loop disposed on a memory module, and/or at least one retention arm configured to couple the protective housing including a battery backup unit circuit to the memory module.

A RAID controller card may include base card including a memory module socket and/or memory module including a printed circuit board, at least one integrated circuit, at least one test point loop, and a protective housing including a battery backup circuit and at least one L-hook configured for being coupled to the at lest one test point loop, the L-hook disposed on the protective housing including a battery backup circuit.

A method may include arranging at least one integrated circuit on a printed circuit board and/or arranging at least one protective housing including a battery backup unit circuit on the printed circuit board by utilizing at least one L-hook configured for coupling to at least one test point loop disposed on the printed circuit board.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the subject matter disclosed, which is illustrated in the accompanying drawings.

Referring generally to FIGS. 1 through 6, a protective housing including a battery backup unit circuit 100, a RAID controller card 300, and a method for providing a protective housing including a battery backup unit circuit 100 are described. The protective housing including a battery backup unit circuit 100 may further include an L-hook 102 and at least one retention arm 104 and/or means for securing a memory module 200 to a RAID controller card 300.

Figure 1:
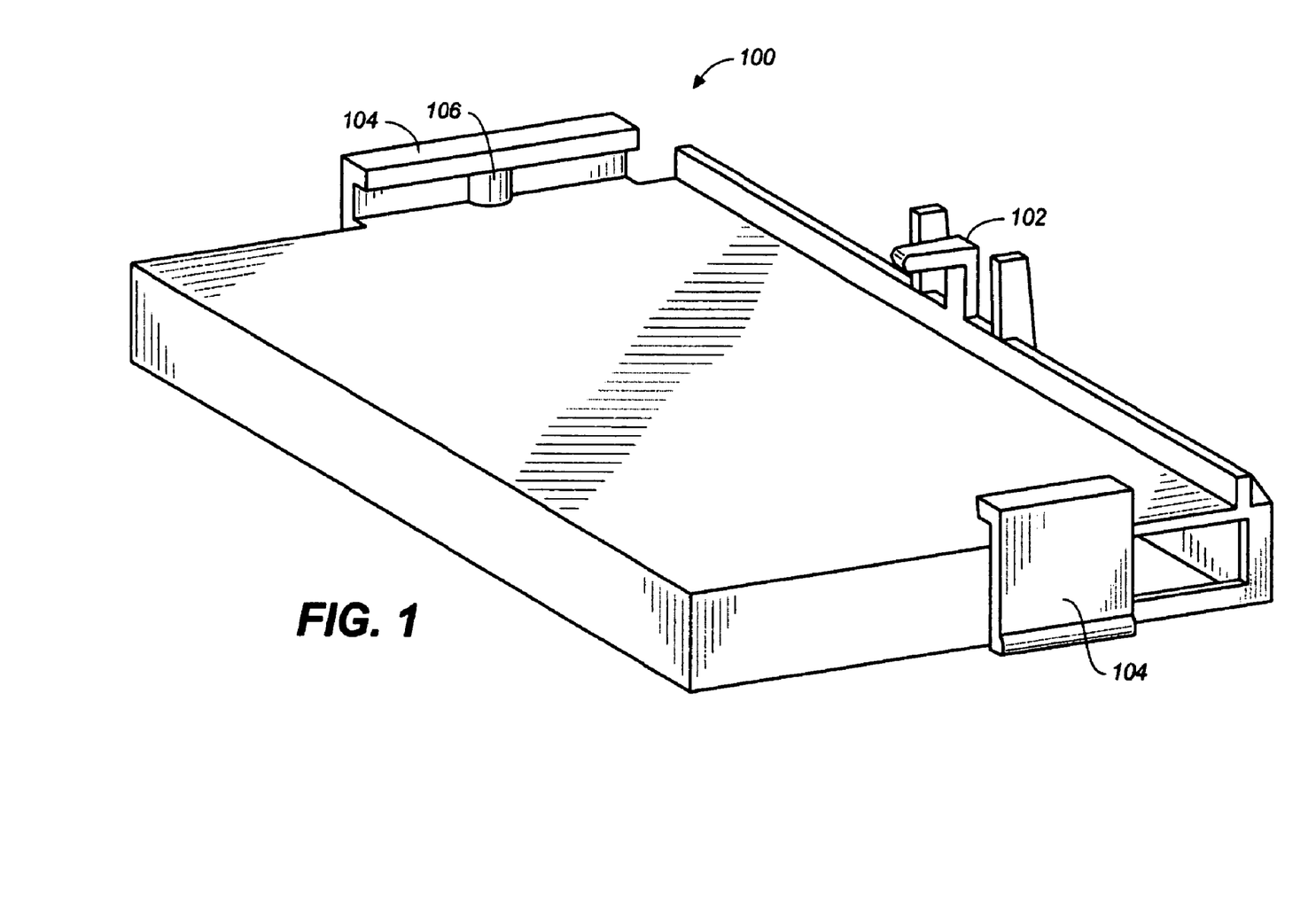
FIG. 1 is an isometric view illustrating a protective housing including a battery backup unit circuit.

The protective housing including a battery backup unit circuit 100 may include an L-hook 102, at least one retention arm 104, a battery backup unit circuit, and/or at least one retention bump 106. As illustrated in FIG. 1, the L-hook 102 may be disposed substantially on one side of the protective housing including a battery backup unit circuit 100 and may protrude outwardly from the surface of the protective housing including a battery backup unit circuit 100. Additionally, the L-hook 102 may be disposed in any location suitable for coupling to at least one test point loop disposed on a memory module 200 and/or a base card 308. In one example, a protective housing including a battery backup unit circuit 100 includes one L-hook and two retention arms with each retention arm having one retention bump.

Figure 2:
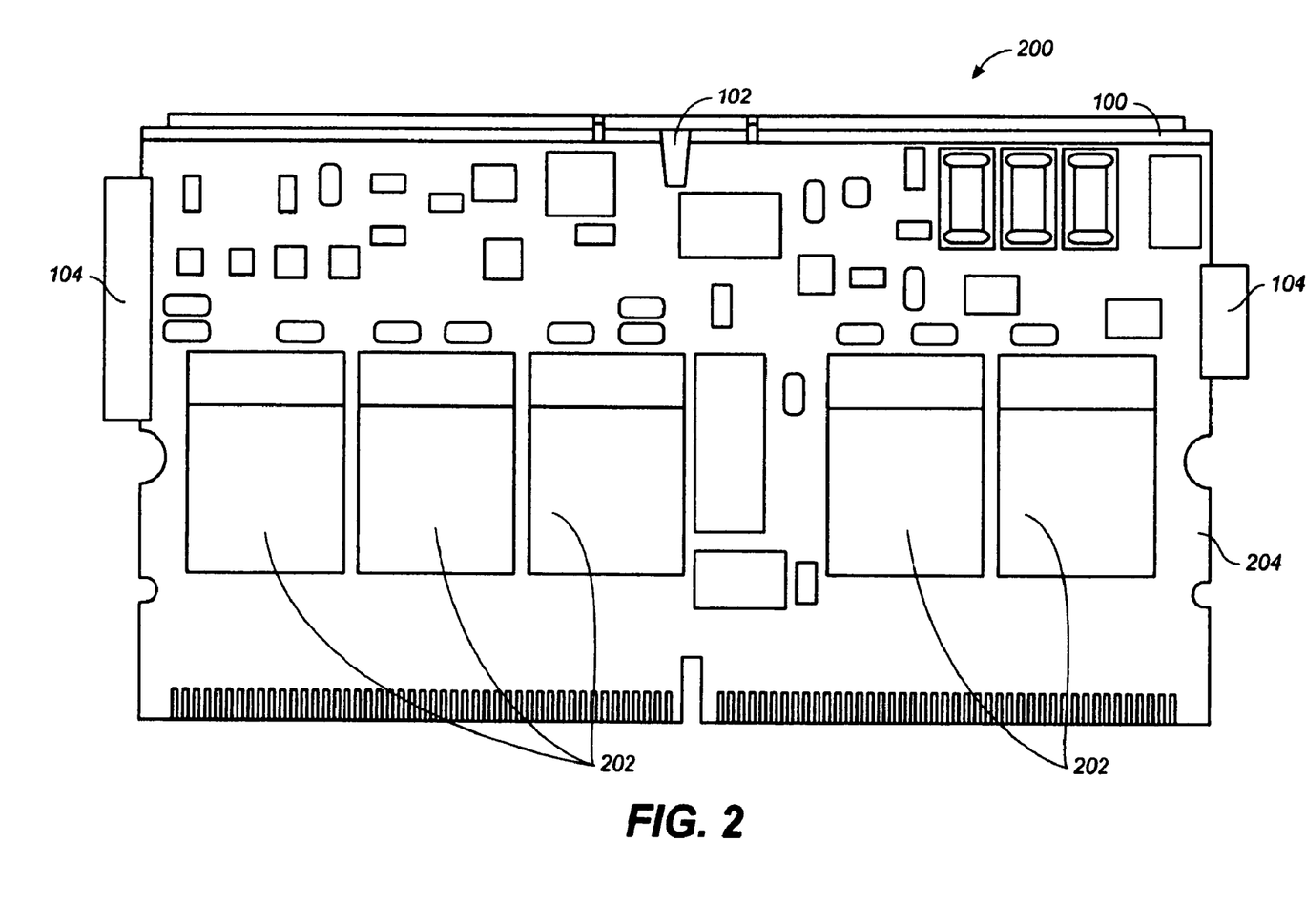
FIG. 2 is a side elevation view of a memory module utilizing a protective housing including a battery backup unit circuit.
Figure 3:
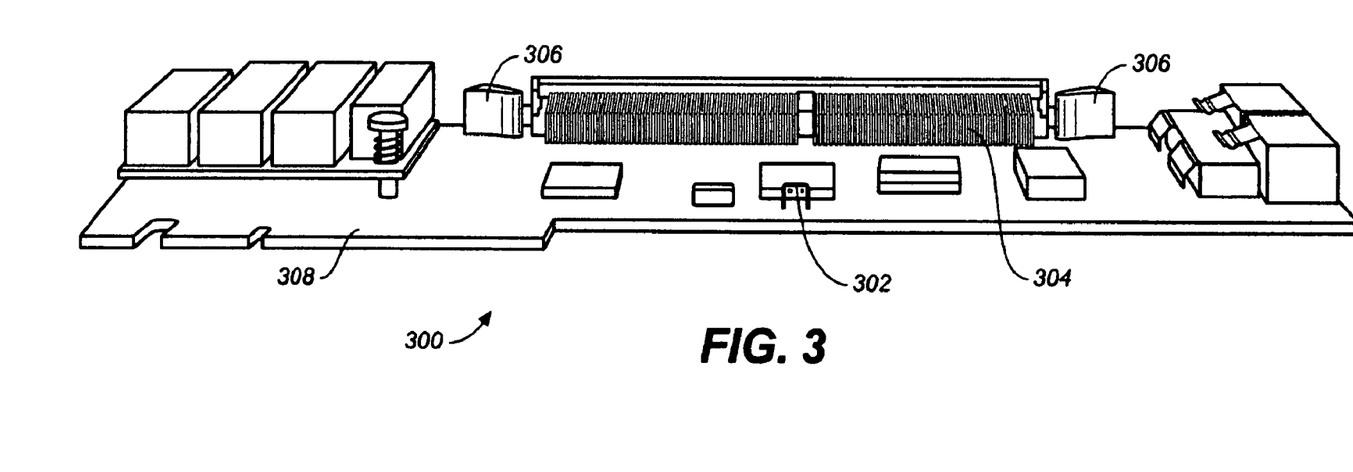
FIG. 3 is an isometric view of a RAID controller card.
Figure 4:
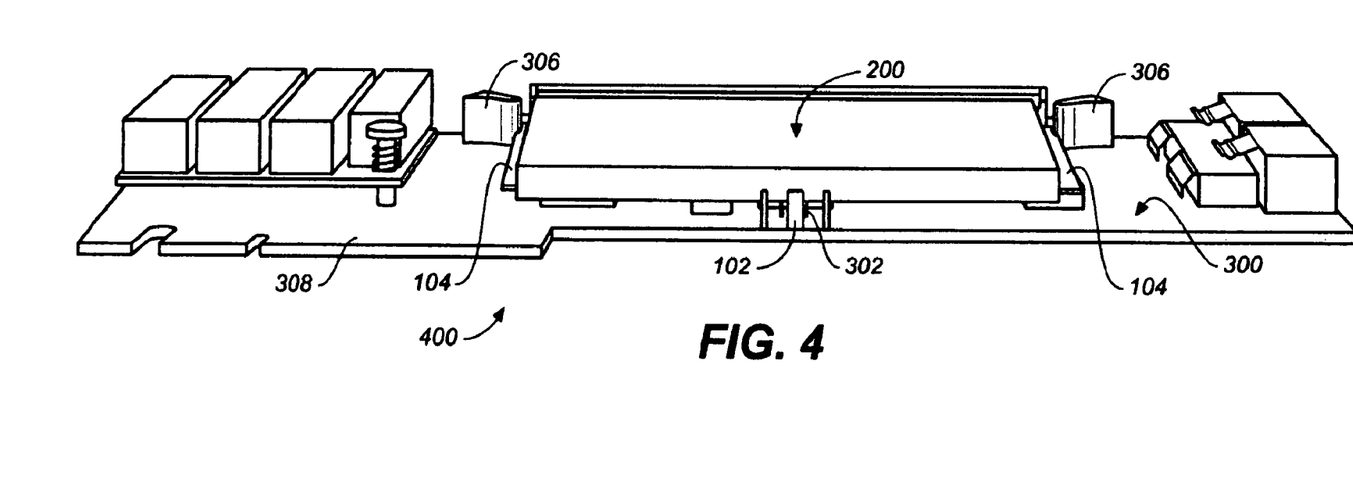
FIG. 4 is an isometric view of a RAID controller card utilizing a memory module utilizing a protective housing including a battery backup unit circuit.
Figure 5:
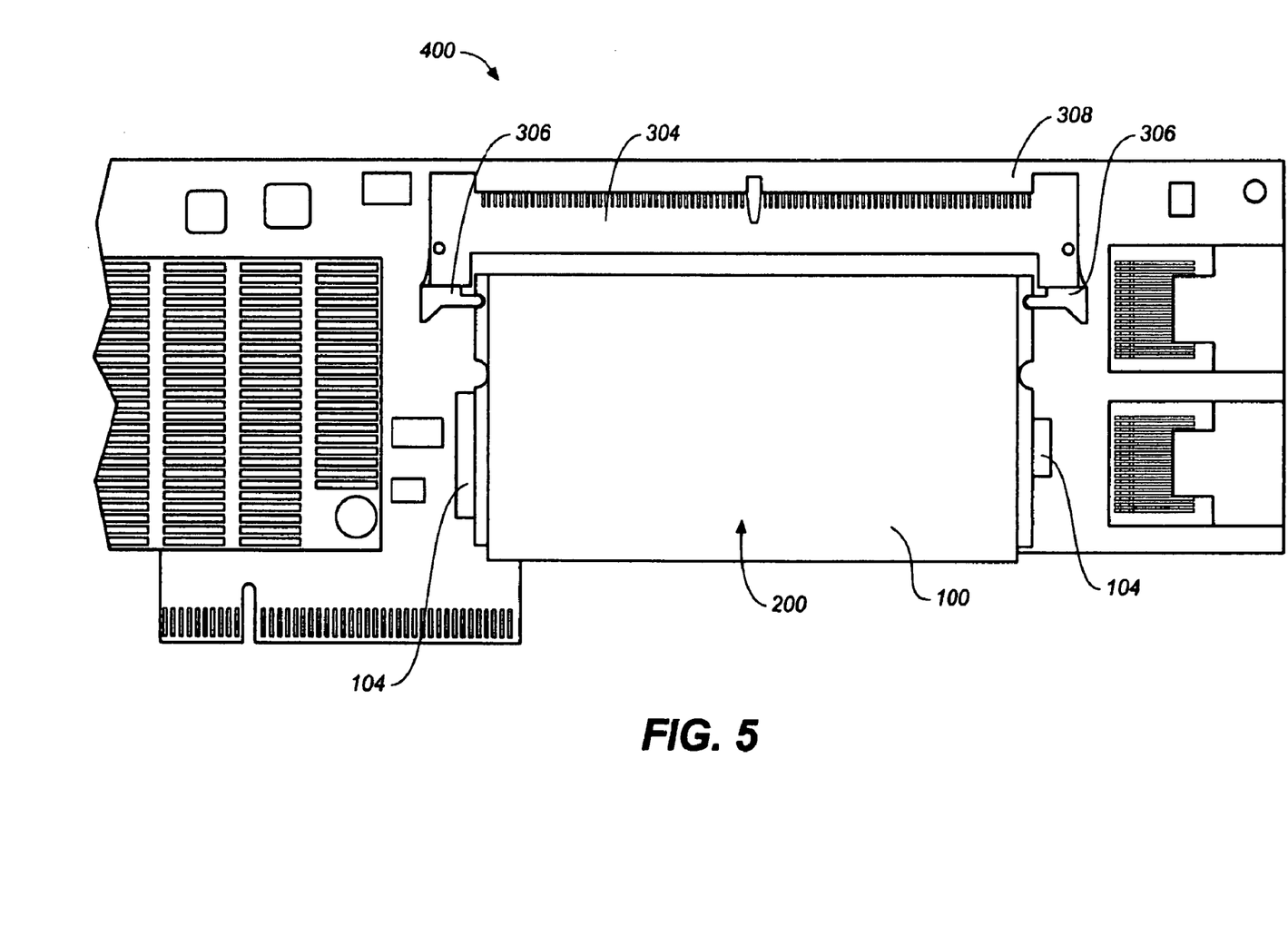
FIG. 5 is a side elevation view illustrating the RAID controller card utilizing a memory module utilizing a protective housing including a battery backup unit circuit in FIG. 4.

As illustrated in FIG. 1, a retention arm 104 may be disposed on at least one side of the protective housing including a battery backup unit circuit 100. A retention arm 104 may function to keep the protective housing including a battery backup unit circuit 100 and a memory module 200 co-planar, as illustrated in FIG. 2. At least one retention bump 106 may be disposed on an inner surface of the retention arm 104 for alignment with a corresponding notch in the memory module 200 and/or the printed circuit board 204 of the memory module 200. In one instance, a protective housing including a battery backup unit circuit 100 includes two retention arms each with one retention bump.

A printed circuit board 204 may include a board utilized to mechanically support and/or electrically connect electric components by utilizing conductive pathways disposed on a non-conductive substrate. The conductive pathways may include pathways and/or traces etched from copper sheets laminated on the printed circuit board 204. The board utilized to mechanically support and/or electrically connect electric components may comprise a variety of materials including phenolic paper, fiberglass, and different plastics. The board may generally be in a square shape and/or a rectangular shape and have a first opposing side and a second opposing side for arranging components, such as a protective housing including a battery backup unit circuit 100 and/or at least one integrated circuit 202. In one example, a printed circuit board composition may include a combination of fiberglass mat, non-woven material and resin.

The protective housing including a battery backup unit circuit 100 may include at least one battery backup unit circuit. A battery backup unit circuit may include a battery disposed within the protective housing including a battery backup unit circuit 100. The battery backup unit circuit may protect cached data in the memory module 100 by providing backup power if the main power source fails. One example of a battery backup unit circuit may include a lithium-ion polymer battery. A lithium-ion polymer battery may include a rechargeable battery that does not require a metal battery cell casing. A lithium-ion polymer battery cell may have a flexible, foil-type and/or polymer laminate case while still having an organic solvent. A lithium-ion polymer battery may be advantageous because it generally may not have a metal battery casing and therefore may be formed into a specific shape designed to fit the device it may power. Alternately, a protective housing including metal may be utilized in the battery backup unit. Further, the battery backup unit circuit may include a smart battery system. A smart battery system (also referred to as an intelligent battery system) may include a battery equipped with a microchip or other type of controller. A microchip and/or controller may act as a communication medium between the battery and an external application, such as a computer and/or a charger. The microchip may communicate statistical information, such as battery fuel gauge technology, charging status, temperature, voltage, current and/or remaining charge. Additionally, the microchip may provide protection for the battery, such as preventing overcharging, under-discharging, and/or short-circuiting. In one instance, protective housing including a battery backup unit circuit 100 includes a battery backup unit circuit comprising a smart lithium-ion polymer battery meeting the dimension requirements of fitting on a dual in-line memory module utilized on a low-profile SAS RAID card and having the ability to detect charging status. In another instance, protective housing including a battery backup unit circuit 100 includes a polymer cell.

The memory module 200 may include at least one integrated circuit 202. An integrated circuit (also referred to as an IC, a microcircuit, a microchip, a silicon chip, or a chip) may include a miniaturized electronic circuit (consisting mainly of semiconductor devices, as well as passive components) manufactured in the surface of a thin substrate of semiconductor material. One example of a memory module 100 having multiple integrated circuits may include random access memory (RAM), such as a dual in-line memory module (DIMM). In one instance, memory module 100 includes five RAM integrated circuits.

The memory module 200 may be coupled to a RAID controller card 300 by utilizing an L-hook 102 disposed on the protective housing including a battery backup unit circuit 100 and a test point loop 302 disposed on the RAID controller card 300. A RAID controller card 300 may include a base card 308, a RAID controller, and/or a RAID physical disk drive, which may be utilized in a RAID storage system 300. Additionally, a RAID controller card 300 may include a memory module socket 304 and at least one socket arm 306 for engaging a memory module 200. The memory module 200 and memory module socket 304 may be disposed on the RAID controller card 300 and/or a base card in multiple configurations. For example, the memory module 200 may be disposed on a base card 308 closest to a motherboard when coupled with a PCI slot. In another example, the memory module 200 may be disposed on a base card 308 farthest from a motherboard when base card 308 is coupled with a PCI slot. Additionally, when coupled with memory module socket 304, the protective housing including a battery backup unit circuit 100 may face toward the base card 308 or away from the base card 308. In one instance, memory module 200 is inserted into memory module socket 304 and two socket arms 306 latch to memory module 200. L-hook 102 may engage test point loop 302 for further securing memory module 200 to RAID controller card 300. A RAID controller card 300 may be coupled to a RAID storage system 600 by utilizing a peripheral component interconnect 602. A peripheral component interconnect 602 may include a computer bus for attaching a peripheral device to a computer motherboard. For example, a peripheral component interconnect 602 may include an expansion slot. Some examples of expansion slots may include PCI-X, PCI Express 16X, PCI, PCI-Express 1X, and/or other types and sizes of expansion slots. A RAID storage system 600 may include a redundant array of independent disks. Generally, a RAID storage system 600 may include a computer data storage scheme that divides and replicates data among multiple hard disk drives. In one instance, RAID storage system 600 includes a RAID controller card 300 with a memory module 200 inserted into memory module socket 304, and memory module 200 includes two socket arms 306 and an L-hook 102 for engaging test point loop 302 disposed on the RAID controller card 300.

Figure 7:
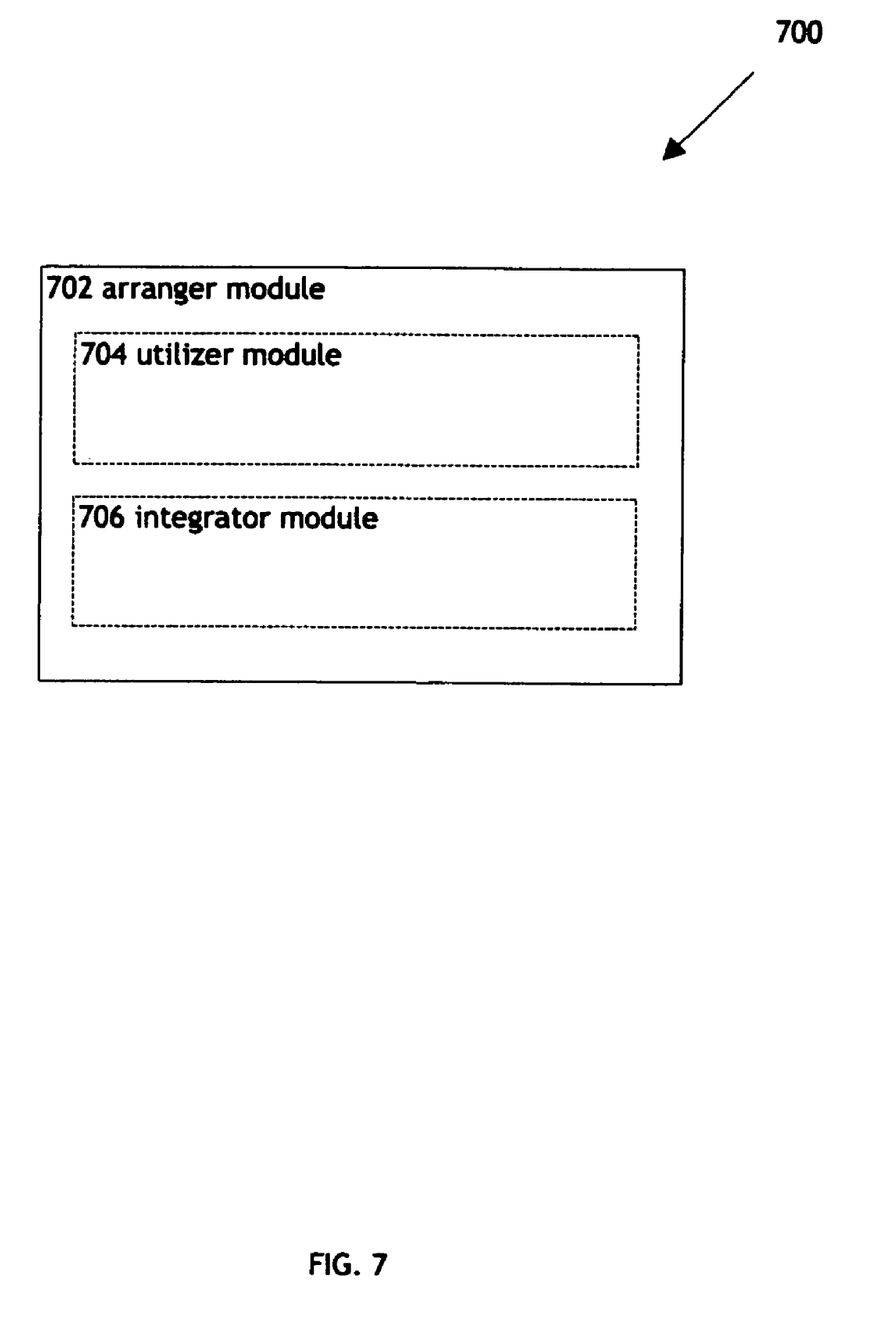
FIG. 7 illustrates an exemplary environment in which one or more technologies may be implemented.

Referring to FIG. 7, a system 700 for arranging at least one integrated circuit on a printed circuit board and/or arranging at least one protective housing including a battery backup unit circuit on the printed circuit board by utilizing at least one L-hook configured for coupling to at least one test point loop disposed on the printed circuit board is illustrated. The system 700 may include arranger module 702. Arranger module 702 may include utilizer module 704 and/or integrator module 706. System 700 generally represents instrumentality for arranging at least one integrated circuit on a printed circuit board and/or arranging at least one protective housing including a battery backup unit circuit on the printed circuit board by utilizing at Least one L-hook configured for coupling to at least one test point loop disposed on the printed circuit board. The steps of arranging at least one integrated circuit on a printed circuit board and/or arranging at least one protective housing including a battery backup unit circuit on the printed circuit board by utilizing at least one L-hook configured for coupling to at least one test point loop disposed on the printed circuit board may be accomplished electronically (e.g. with a set of interconnected electrical components, an integrated circuit, and/or a computer processor, etc.) and/or mechanically (e.g. an assembly line, a robotic arm, etc.).

Figure 8:
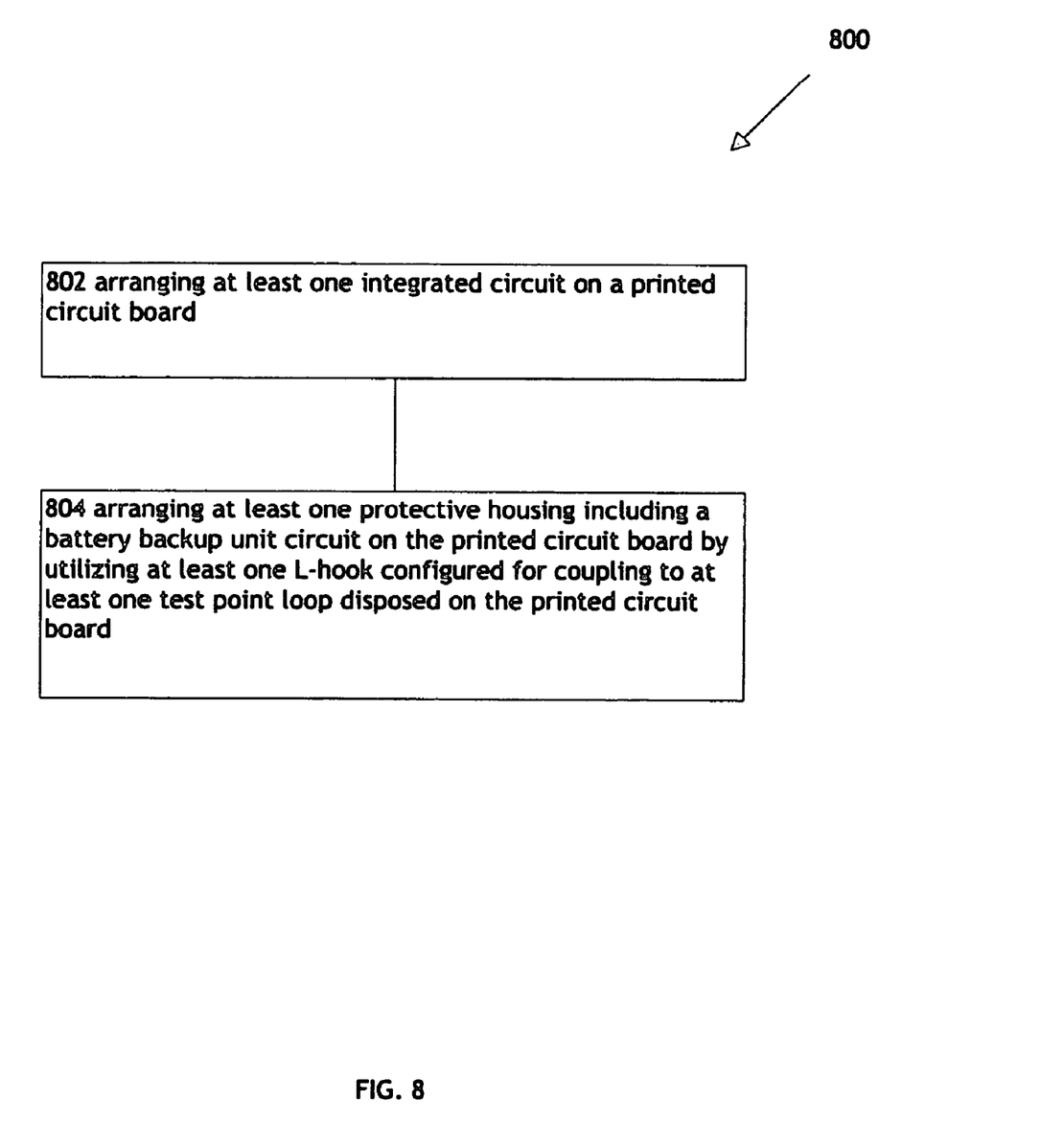
FIG. 8 illustrates an operational flow representing example operations related to providing a protective housing including a battery backup unit circuit.
Figure 9:
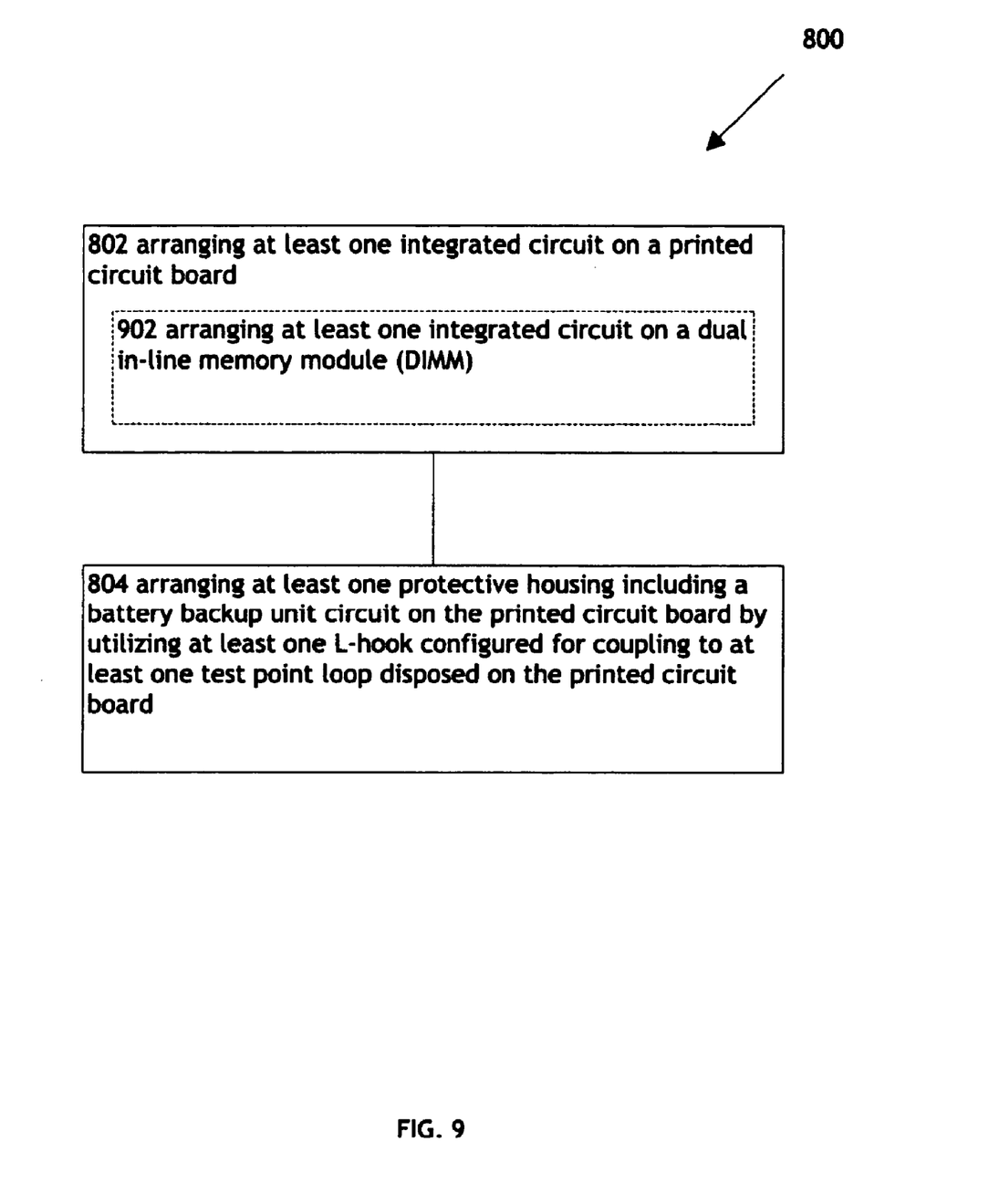
FIG. 9 illustrates an alternative embodiment of the operational flow of FIG. 8.
Figure 10:
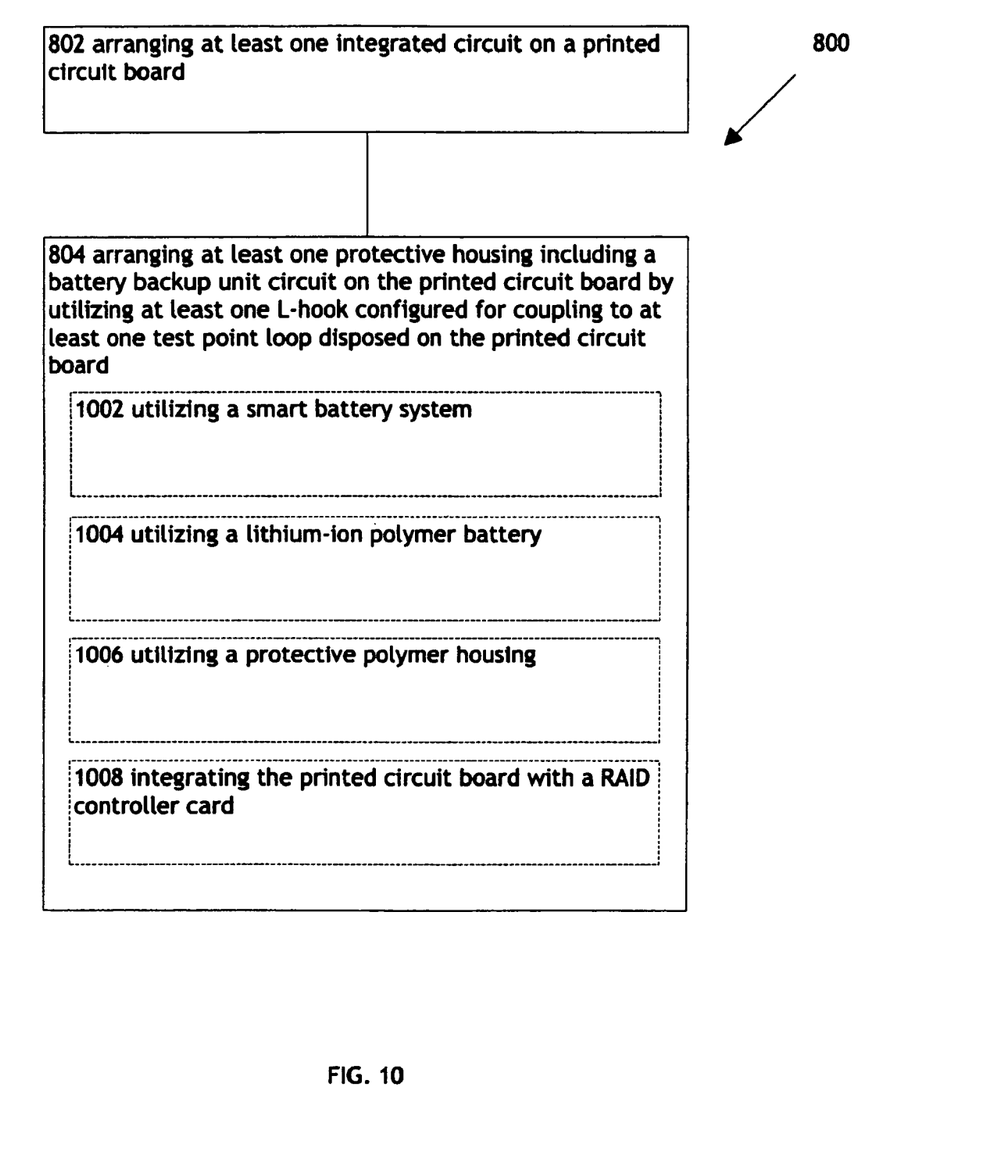
FIG. 10 illustrates an alternative embodiment of the operational flow of FIG. 8.

Referring generally to FIGS. 8 through 10, methods for providing a device comprising a protective housing including a battery backup circuit are disclosed. FIG. 8 illustrates an operational flow 800 representing example operations related to providing a device comprising a protective housing including a battery backup circuit are disclosed. In FIG. 8 and in following figures that include various examples of operational flows, discussion and explanation may be provided with respect to the above-described examples of FIGS. 1 through 8, and/or with respect to other examples and contexts. However, it should be understood that the operational flows may be executed in a number of other environments and contexts, and/or in modified versions of FIGS. 1 through 8. Also, although the various operational flows are presented in the sequence(s) illustrated, it should be understood that the various operations may be performed in other orders than those which are illustrated, or may be performed concurrently.

After a start operation, the operational flow 800 moves to an arranging operation 802, where arranging at least one integrated circuit on a printed circuit board may occur. For example, as generally shown in FIGS. 1 through 7, a printed circuit board 204 may include at least one integrated circuit 202. Arranging operation 802 may be conducted in an automated fashion such as, for example, by an automated arranger module 702 (e.g. a robotic arm and/or automated production line configured to arrange the at least one integrated circuit 202), such as those commonly found in the manufacturing arts.

Then, in another arranging operation 804, arranging at least one protective housing including a battery backup unit circuit on the printed circuit board by utilizing at least one L-hook configured for coupling to at least one test point loop disposed on the printed circuit board may occur. For example, as shown in FIGS. 1 through 7, the printed circuit board 204 may be arranged with protective housing including a battery backup unit circuit 100. Arranging operation 804 may be conducted in an automated fashion such as, for example, by an automated arranger module 702 (e.g. a robotic arm and/or automated production line configured to arrange the printed circuit board 204 with protective housing including a battery backup unit circuit 100) such as those commonly found in the manufacturing arts.

FIG. 9 illustrates alternative embodiments of the example operational flow 800 of FIG. 8. FIG. 9 illustrates example embodiments where the arranging operation 802 may include at least one additional operation. Additional operations may include an operation 902.

At operation 902, arranging at least one integrated circuit on a dual in-line memory module (DIMM) may occur. For example, the arranger module 702 may arrange at least one integrated circuit on a dual in-line memory module (DIMM). In one instance, arranger module 702 includes a robot arm and/or automated production line configured to arrange an integrated circuit 202.

Figure 6:
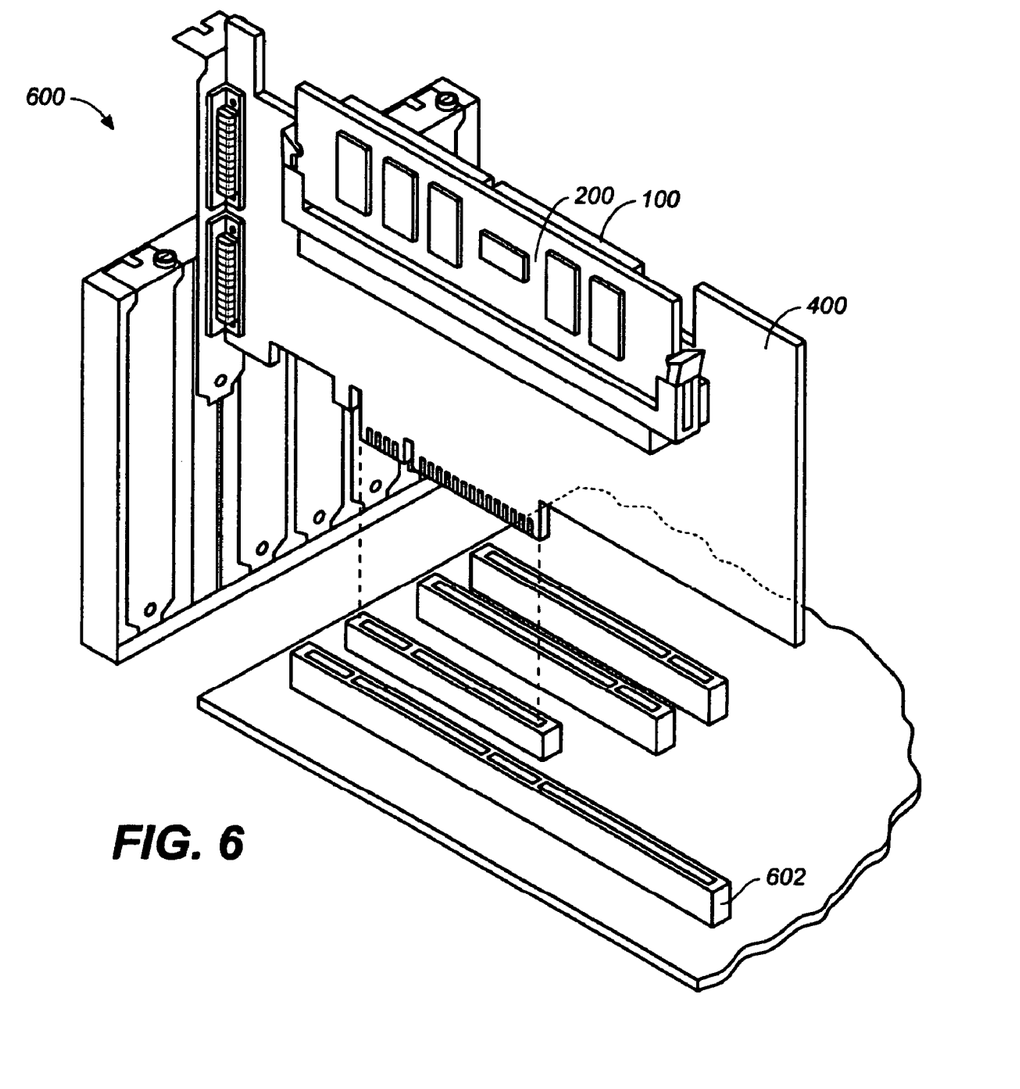
FIG. 6 is a partial isometric view illustrating a RAID storage system.

FIG. 10 illustrates alternative embodiments of the example operational flow 800 of FIG. 8. FIG. 6 illustrates example embodiments where the arranging operation 804 may include at least one additional operation. Additional operations may include operation 1002, operation 1004, operation 1006, and/or operation 1008.

At operation 1002, utilizing a smart battery system may occur. For example, the utilizer module 704 may utilize a smart battery system. In one instance, utilizer module 704 includes a robot arm and/or automated production line configured to utilize a smart battery system in a protective housing including a battery backup unit circuit 100 in FIGS. 1 through 7. At operation 1004, utilizing a lithium-ion polymer battery may occur. For example, the utilizer module 704 may utilize a lithium-ion polymer battery. In one instance, utilizer module 704 includes a robot arm and/or automated production line configured to utilize a lithium-ion polymer battery in a protective housing including a battery backup unit circuit 100 in FIGS. 1 through 7. At operation 1006, utilizing a protective polymer housing may occur. For example, the utilizer module 704 may utilize a protective polymer housing. In one instance, utilizer module 704 includes a robot arm and/or automated production line configured to utilize a protective polymer housing for a protective housing including a battery backup unit circuit 100 in FIGS. 1 through 7. At operation 1008, integrating the printed circuit board with a RAID controller card may occur. For example, the integrator module 706 may integrate the printed circuit board with a RAID controller card. In one instance, integrator module 704 includes a robot arm and/or automated production line configured to integrate the printed circuit board with a RAID controller card in FIGS. 1 through 7.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A device, comprising:
    a protective housing including a battery backup unit circuit;
    at least one L-hook disposed on the protective housing including a battery backup unit circuit, the L-hook configured for being coupled to a test point loop, the test point loop coupled to an integrated circuit and disposed on a memory module; and
    at least one retention arm configured to couple the protective housing including a battery backup unit circuit to the memory module, the at least one retention arm including a retention bump configured to fit within a notch of the memory module.

2. The memory module in claim 1, wherein the protective housing including a battery backup unit circuit comprises:
    a polymer.

3. The memory module in claim 1, wherein the protective housing including a battery backup unit circuit comprises:
    a smart battery system.

4. The memory module in claim 1, wherein the protective housing including a battery backup unit circuit comprises:
    a lithium-ion polymer battery.

5. The memory module in claim 1, wherein the at least one L-hook disposed on the protective housing including a battery backup unit circuit, the L-hook configured for being coupled to a test point loop, the test point loop coupled to an integrated circuit and disposed on a memory module comprises:
    a dual in-line memory module (DIMM).

6. The memory module in claim 1, wherein the at least one L-hook disposed on the protective housing including a battery backup unit circuit, the L-hook configured for being coupled to a test point loop, the test point loop coupled to an integrated circuit and disposed on a memory module comprises:
    a memory module including a printed circuit board with a first edge approximately 3.2 inches and a second edge approximately 1.7 inches.

7. A RAID controller card, comprising:
    a base card including a memory module socket; and a memory module including a printed circuit board, at least one integrated circuit, at least one test point loop, a protective housing including a battery backup circuit, at least one retention arm, the at least one retention arm coupled to a side of said protective housing, the at least one retention arm including a retention bump configured to fit within a notch of the memory module; and at least one L-hook configured for being coupled to the at least one test point loop, the at least one test point loop coupled to said at least one integrated circuit and disposed on said printed circuit board, the L-hook disposed on the protective housing including a battery backup circuit.

8. The RAID controller card in claim 7, wherein the base card including a memory module socket comprises:
a low profile serial attached SCSI (SAS) RAID card.

9. The RAID controller card in claim 7, wherein the memory module including a printed circuit board, at least one integrated circuit, at least one test point loop, a protective housing including a battery backup circuit, at least one retention arm, the at least one retention arm coupled to a side of said protective housing, the at least one retention arm including a retention bump configured to fit within a notch of the memory module; and at least one L-hook configured for being coupled to the at least one test point loop, the at least one test point loop coupled to said at least one integrated circuit and disposed on said printed circuit board, the L-hook disposed on the protective housing including a battery backup circuit comprises:
a dual in-line memory module (DIMM).

10. The RAID controller card in claim 7, wherein the memory module including a printed circuit board, at least one integrated circuit, at least one test point loop, a protective housing including a battery backup circuit, at least one retention arm, the at least one retention arm coupled to a side of said protective housing, the at least one retention arm including a retention bump configured to fit within a notch of the memory module; and at least one L-hook configured for being coupled to the at least one test point loop, the at least one test point loop coupled to said at least one integrated circuit and disposed on said printed circuit board, the L-hook disposed on the protective housing including a battery backup circuit comprises:
a printed circuit board with a first edge approximately 3.2 inches and a second edge approximately 1.7 inches.

11. The RAID controller card in claim 7, wherein the memory module including a printed circuit board, at least one integrated circuit, at least one test point loop, a protective housing including a battery backup circuit, at least one retention arm, the at least one retention arm coupled to a side of said protective housing, the at least one retention arm including a retention bump configured to fit within a notch of the memory module; and at least one L-hook configured for being coupled to the at least one test point loop, the at least one test point loop coupled to said at least one integrated circuit and disposed on said printed circuit board, the L-hook disposed on the protective housing including a battery backup circuit comprises:
a smart battery system.

12. The RAID controller card in claim 7, wherein the memory module including a printed circuit board, at least one integrated circuit, at least one test point loop, a protective housing including a battery backup circuit, at least one retention arm, the at least one retention arm coupled to a side of said protective housing, the at least one retention arm including a retention bump configured to fit within a notch of the memory module; and at least one L-hook configured for being coupled to the at least one test point loop, the at least one test point loop coupled to said at least one integrated circuit and disposed on said printed circuit board, the L-hook disposed on the protective housing including a battery backup circuit comprises:
a lithium-ion polymer battery.

13. The RAID controller card in claim 7, wherein the memory module including a printed circuit board, at least one integrated circuit, at least one test point loop, a protective housing including a battery backup circuit, at least one retention arm, the at least one retention arm coupled to a side of said protective housing, the at least one retention arm including a retention bump configured to fit within a notch of the memory module; and at least one L-hook configured for being coupled to the at least one test point loop, the at least one test point loop coupled to said at least one integrated circuit and disposed on said printed circuit board, the L-hook disposed on the protective housing including a battery backup circuit comprises:
a polymer cell.

14. A method, comprising:
arranging at least one integrated circuit on a printed circuit board; and
arranging at least one protective housing including a battery backup unit circuit on the printed circuit board by utilizing at least one L-hook configured for coupling to at least one test point loop, the at least one test point loop coupled to the at least one integrated circuit and disposed on the printed circuit board, and at least one retention arm, the at least one retention arm coupled to a side of said at least one protective housing, the at least one retention arm including a retention bump configured to fit within a notch of the printed circuit board.

15. The method in claim 14, wherein arranging at least one integrated circuit on a printed circuit board comprises:
arranging at least one integrated circuit on a dual in-line memory module (DIMM).

16. The method in claim 14, wherein arranging at least one protective housing including a battery backup unit circuit on the printed circuit board by utilizing at least one L-hook configured for coupling to at least one test point loop, the at least one test point loop coupled to the at least one integrated circuit and disposed on the printed circuit board, and at least one retention arm, the at least one retention arm coupled to a side of said at least one protective housing, the at least one retention arm including a retention bump configured to fit within a notch of the printed circuit board comprises:
utilizing a smart battery system.

17. The method in claim 14, wherein arranging at least one protective housing including a battery backup unit circuit on the printed circuit board by utilizing at least one L-hook configured for coupling to at least one test point loop, the at least one test point loop coupled to the at least one integrated circuit and disposed on the printed circuit board, and at least one retention arm, the at least one retention arm coupled to a side of said at least one protective housing, the at least one retention arm including a retention bump configured to fit within a notch of the printed circuit board comprises:
utilizing a lithium-ion polymer battery.

18. The method in claim 14, wherein arranging at least one protective housing including a battery backup unit circuit on the printed circuit board by utilizing at least one L-hook configured for coupling to at least one test point loop, the at least one test point loop coupled to the at least one integrated circuit and disposed on the printed circuit board, and at least one retention arm, the at least one retention arm coupled to a side of said at least one protective housing, the at least one retention arm including a retention bump configured to fit within a notch of the printed circuit board comprises:

utilizing a protective polymer housing.

19. The method in claim 14, further comprising:

integrating the printed circuit board with a RAID controller card.

* * * * *